United States Patent [19]

Stordeur

[11] 4,266,441
[45] May 12, 1981

[54] POSITIONING DEVICE WITH A PIVOTABLE POSITIONING MEMBER

[75] Inventor: Yves A. H. Stordeur, Paris, France

[73] Assignee: Societe Anonyme Francaise du Ferodo, Paris, France

[21] Appl. No.: 952,333

[22] Filed: Oct. 18, 1978

[30] Foreign Application Priority Data

Oct. 20, 1977 [FR] France .................. 77 31611

[51] Int. Cl.³ .............................. G05G 1/04
[52] U.S. Cl. ...................... 74/523; 74/526; 74/531
[58] Field of Search .......... 74/523, 526, 531; 403/98; 16/179, DIG. 13; 24/108, 217

[56] References Cited

U.S. PATENT DOCUMENTS

| 2,919,601 | 1/1960 | Cain | 74/531 |
| 4,078,449 | 3/1978 | Kelly | 74/526 |

FOREIGN PATENT DOCUMENTS

| 9163 | of 1886 | United Kingdom | 24/108 |
| 1204115 | 9/1970 | United Kingdom | 74/523 |

*Primary Examiner*—Kenneth Dorner
*Attorney, Agent, or Firm*—Staas and Halsey

[57] ABSTRACT

A positioning device with a pivotable positioning member. The positioning member comprises a guide lug spaced from and parallel to its pivot axis, the guide lug having a head portion which may be introduced into an enlarged end of a guideway in a support but which maintains the positioning member parallel to the pivot axis. An abutment prevents the guide lug from re-entering the enlarged end of the guideway. A strip integrally formed with the positioning member has a protruding portion which bears against one side of the support tensioning the strip. The pivotal mounting is afforded by co-operable detents including a pivot pin (e.g. on the support) with a tapered end which snaps into an aperture defined by a pair of integrally formed flexible strips (e.g. on the positioning member). The oblong aperture permits the pivot pin to shift therein as the pointer at the other end of the positioning member undergoes substantially rectilinear displacement. The positioning device may be used to control the position of a motor vehicle air conditioning vent flap.

19 Claims, 7 Drawing Figures

POSITIONING DEVICE WITH A PIVOTABLE POSITIONING MEMBER

The present invention relates to a positioning device including a pivotable member or arm and a support therefor.

Known positioning devices of this type are difficult to assemble and are comprised of a great number of parts. Further, in known devices after a certain period of use, play appears which interferes with their operation.

An object of the invention is to remedy the foregoing drawbacks.

Another object of the invention is the provision of a positioning device of particularly simple and economical construction.

Yet another object of the invention is to provide a positioning device in which the mounting of the positioning member on its support is easy while precluding the accidental or inadvertent disassembly of the pivoted member once mounted.

According to a first aspect of the invention, the positioning device is of the type of those in which the positioning member has a lug substantially parallel to and spaced from its pivot axis, the lug being adapted to co-operate with a guideway in the support. According to the invention in such a device, the lug has a head wider than the guideway so as to maintain the positioning member on the support in a direction parallel to the pivot axis, and the guideway has at least one enlarged end for introducing the lug into the guideway, and abutment means are provided for preventing, after the positioning member is mounted on its support, the lug from re-entering the enlarged end of the guideway. Despite the structural simplicity such positioning device permits the easy mounting of the positioning member on its support while preventing the positioning member from becoming inadvertently or accidentally disassembled.

According to a second aspect of the invention there is provided a positioning device comprising pivotable positioning member and a support, the support and the pivotable member being provided with a complementary pivot pin and aperture. In such an assembly according to the invention, an auxiliary aperture is associated with the first-mentioned aperture to define therewith a narrow strip and the pivot pin is continued at its free end by a frustoconical end portion the large base of which has a diameter greater than the pivot pin and its small, free end base has a diameter at most equal to the diameter of the pivot pin, the narrow strip being of such a width that it flexes elastically when the end portion is inserted into the first mentioned aperture, the width of this aperture being, before mounting, smaller than the diameter of the pivot pin. Such positioning device affords particularly easy mounting.

A further aspect of the invention consists in a pivotable positioning member for such a positioning device. Such a positioning member includes, according to the invention, an aperture at one of its ends co-operating with an auxiliary aperture to define a narrow strip elastically flexing perpendicular to the pivot axis; and spaced from the aperture, a lug extending substantially parallel to the pivot axis of the positioning member and continued by a head, the lug and the head being of one-piece construction with the rest of the positioning member, and another strip also in one piece with the rest of the pivoted member and adapted to flex elastically parallel to the pivot axis, the second strip being continued by a protruding portion in a direction parallel to the pivot axis and on the same side of the positioning member than the lug.

Alternatively, the above-described positioning member comprises, in lieu of the aperture and the narrow strip associated therewith, a pivot pin extending parallel to the pivot axis of the positioning member.

These and other objects, features and advantages will become clearer from the description of a preferred embodiment, with reference to the accompanying drawings, in which.

Figure 1:
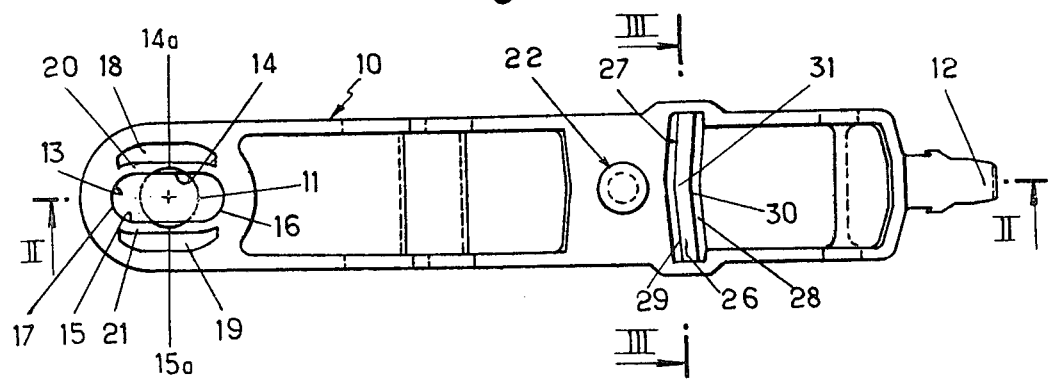
FIG. 1 shows a top plan view of a pivotable positioning member embodying the present invention.
Figure 2:
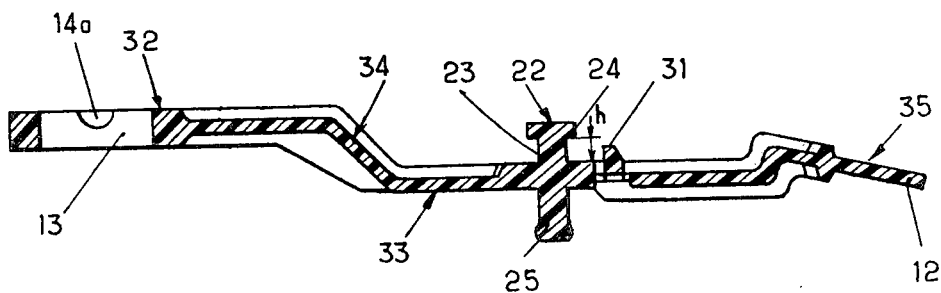
FIG. 2 is a cross-sectional view of the positioning member taken on the line II—II in FIG. 1.
Figure 3:
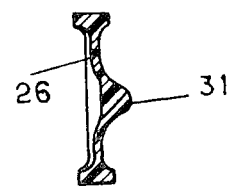
FIG. 3 is a cross-sectional view taken on the line III—III in FIG. 1.

The pivoted member as illustrated in FIGS. 1-3 comprises an elongate arm 10 adapted to be mounted for rotational movement around a pivot pin 11 (represented in fine slotted lines in FIG. 1) perpendicular to the plane of FIG. 1. The arm 10 terminates at one of its ends in a pointer 12. The other end has an oblong or elongated aperture 12 which is adapted to be received on the pivot pin 11. The aperture 12 has two straight sides 14 and 15 parallel to each other and two rounded ends 16 and 17. Auxiliary slots or apertures 18 and 19 are arranged parallel to the sides 14 and 15 of the first-mentioned aperture 13 and spaced a short distance therefrom. Each auxiliary slot 18, 19 is substantially coextensive with the facing side 14, 15 of the aperture so as to define between each slot 18, 19 and the corresponding side 14, 15 of the aperture a relatively narrow, flexible strip 20, 21.

Midway along each side 14, 15 of the aperture 13 is a beveled portion 14a, 15a adapted to facilitate the insertion of the pivot pin 11 into the aperture 13.

Intermediate the ends of the pivoted arm or member 10 is a guide lug 22 projecting substantially perpendicular to the plane of FIG. 1, that is, parallel to the pivot axis, and comprising a stem 23 terminating in a head portion 24 which is greater in diameter than the stem 23. In the illustrated embodiment the positioning arm or member 10 also comprises another lug 25 projecting from the opposite side (FIG. 2).

Between the lug 22 and the pointer 12, though closer to the lug 22, the positioning member or arm 10 has a strip 26 extending transversely relative to the length of the positioning arm or member. Two slits 27 and 28 define the longitudinal edges 29 and 30 of the strip 26. A protruding portion 31 extends from strip 26 from the same side of the pivoted member 10 as the lug 22. As will be seen herein after, the strip 26 constitutes, in effect, a leaf spring which is resilient in a direction perpendicular to the plane of FIG. 1.

The overall configuration of the positioning arm or member 10 is as follows: two parallel substantially planar sections 32 and 33 interconnected by an inclined section 34. Section 32 includes the aperture 12 and the section 33 contains the lugs 22 and 25 as well as strip 26. The planar section 33 terminates in another inclined section 35 which carries the pointer 12.

Now the support or panel 40 of the positioning device will be described in relation to FIGS. 4 and 5. The description will be confined to the parts necessary for the understanding of the invention.

In the illustrated embodiment the support or panel 40 is provided for the rotational mounting of two positioning members or arms (not shown in FIGS. 3 and 4), one around a pivot pin 11a and the other around a pivot pin 11b. The support or panel 40 is of generally flat shape and the pivot pins 11a and 11b protrude perpendicularly to the general plane thereof. One of the positioning members or arms which is normally associated with the pivot pin 11b is disposed on the side of the support or panel 40 which is viewed in FIG. 4 and the other positioning member or arm associated with pivot pin 11a is normally disposed on the other side of the support or panel 40.

Figure 4:
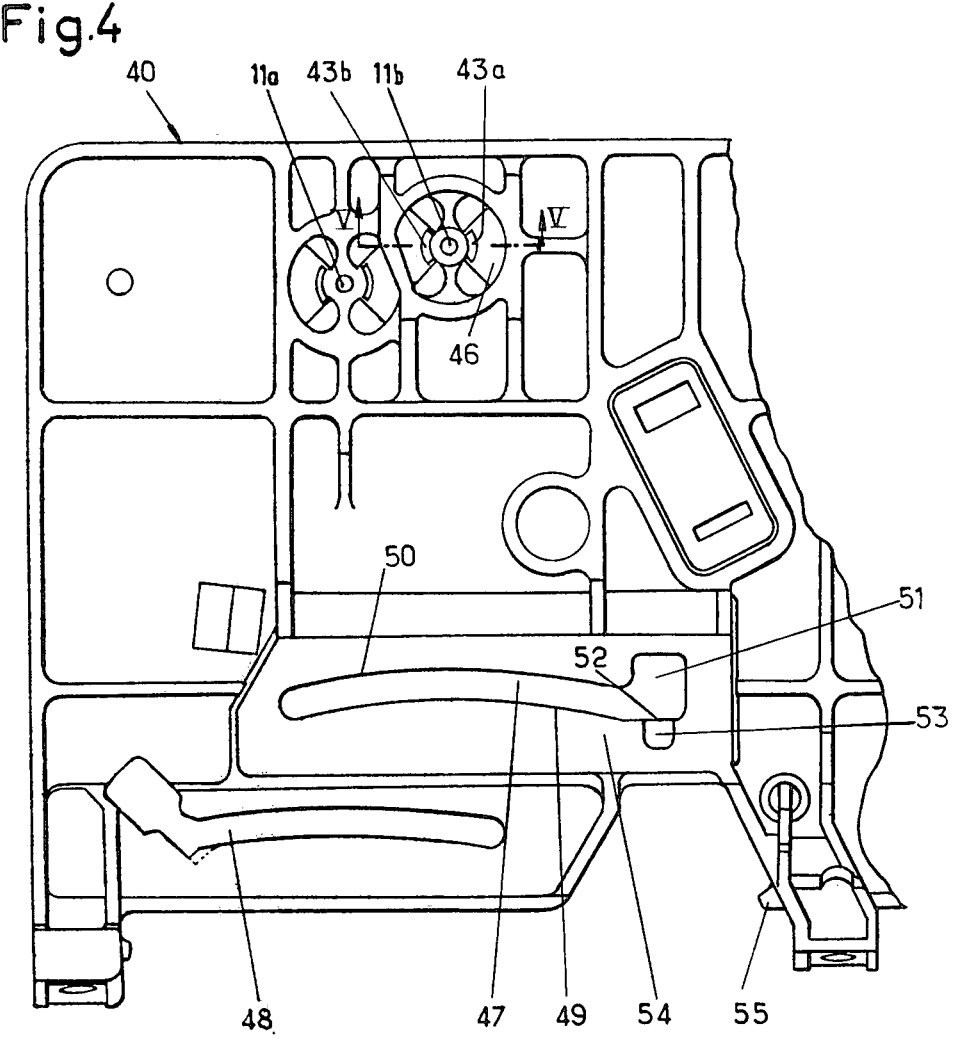
FIG. 4 is a fragmentary top plan view of a support or panel for a positioning device embodying the present invention.
Figure 5:
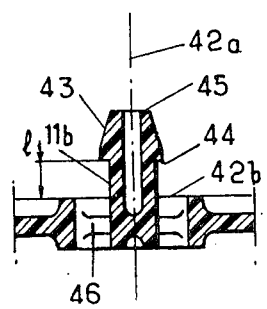
FIG. 5 is a sectional view taken on the line V—V in FIG. 4.

As illustrated in FIGS. 4 and 5, pivot pin 11b is continued by an end portion having the shape of two frustoconical segments 43a, 43b of a truncated cone 43 coaxial to the axis 42a of the pivot pin 11b. The large base 44 has a diameter greater than that of the pivot pin 11b and the tip or small base 45 has a diameter equal to or less than that of the pivot pin 11b so as to facilitate the mounting of the positioning arm or member 10 on the support or panel 40.

The pivot pin 11b is integral with the ribs 46 of the support or panel 40.

A guideway 47 of generally curvilinear shape has its convex edge spaced from and facing the pivot pin 11b. Likewise, a guideway 48 is associated with the pivot pin 11a. The guideways 47 and 48 are of similar shape. Accordingly it will suffice to describe only one of them in detail, viz, guideway 47.

The guideway 47 has edges 49 and 50 uniformly spaced from each other a distance which is lightly greater than the diameter of the stem 23 (FIG. 2) and less than the diameter of the head portion 54 of the guide lug 22.

The guideway 47 has an enlarged end 51 dimensioned so that the head portion 24 of the lug 22 may be inserted into and pass through the enlarged end 51.

The portion of the support or panel 40 immediately surrounding or defining the guideway 47 including its enlarged end 51 is of planar configuration and substantially uniform thickness. The thickness of this part of the support or panel 40 is slightly less than the distance h (FIG. 2) from the base of the stem 23 of the lug 22 to the large base or underside 44 of the head portion of the lug 22.

The enlarged end 51 of the guideway 47 is, in the illustrated embodiment, of generally rectangular shape, comprising an edge 52 which is the continuation of the edge 49 of the guideway 47. The edge 52 comprises a beveled portion 53 which, as will be seen hereinafter, constitutes a ramp permitting, in the course of mounting the positioning member or arm 10 on the support or panel 40 to gradually slide the protruding portion 31, integrally formed with the leaf spring 26, from the enlarged end 51 to the side 54 of the support or panel 40 in order to tension the leaf spring or strip 26, thereby ensuring a force for urging the protruding portion 31 against the support or panel 40 so that after mounting the positioning arm or member 10 remains, in the position in which it was set until the setting is subsequently changed.

An abutment 55 is associated with the guideway 47 and the pivot pin 11b which is farther from the pivot pin 11b than the guideway 47.

Finally, the support or panel 40 which is made of synthetic plastic material is in one-piece molded construction with the pivot pins 11a and 11b. Positioning member or arm 10 is likewise of one-piece molded plastic construction.

The mounting of the positioning arm or member 10 on the associated support or panel 40 will now be described with reference to FIGS. 6 and 7.

Figure 6:
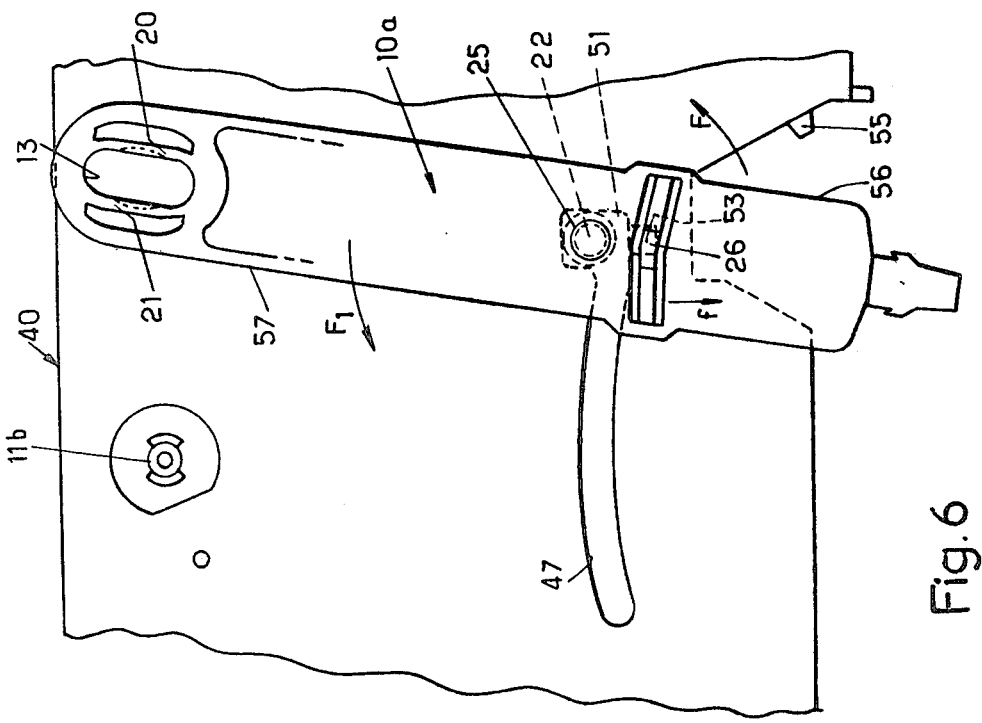
FIG. 6 illustrates an intermediate step in mounting the positioning member, shown in FIG. 1, on the support or panel shown in FIG. 4.

The guide lug 22 on the positioning member or arm 10 is, first of all, introduced into the enlarged end 51 of the guideway 47, the positioning arm or member 10 being in its position illustrated in FIG. 6. The positioning arm or member 10 is the urged in the direction indicated by arrow f and thereafter rocked about the lug 22, counterclockwise as indicated by arrow F. Consequently, the edge 56 of the positioning arm or member 10 comes into engagement with the abutment 55 and at the same time the protruding portion 31 on the strip 26, which was initially inside the enlarged end 51 of the guideway, slides along the beveled portion or ramp 53 thereby tensioning the strip 26.

Figure 7:
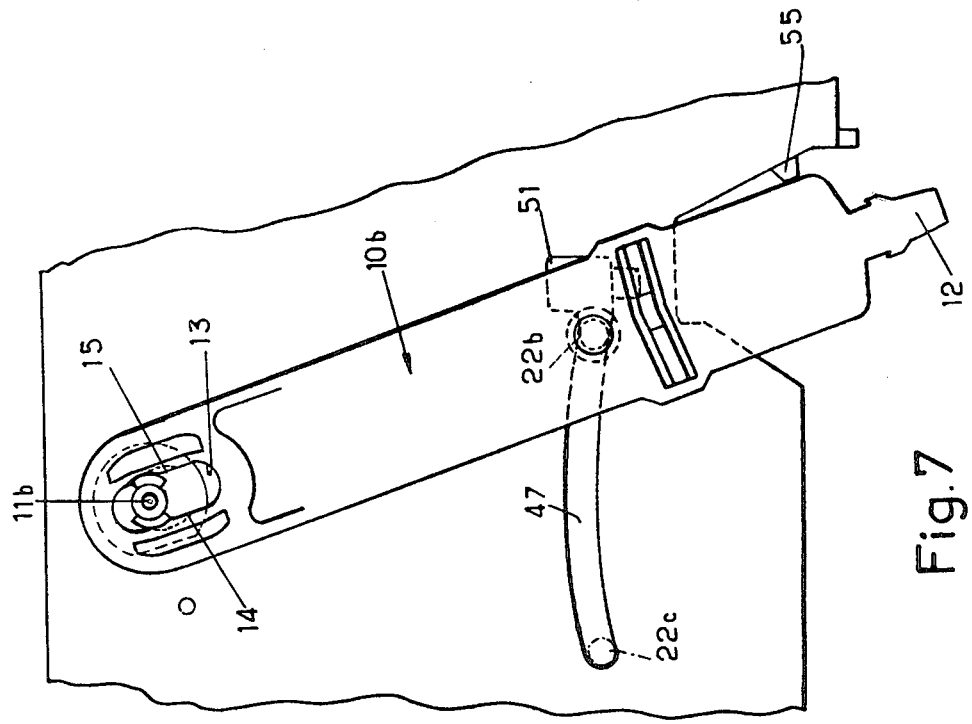
FIG. 7 is a fragmentary view similar to FIG. 6 illustrating the positioning member or arm mounted on the support or panel.

The displacement of the positioning arm first in the direction f and then in the direction F brings the lug 22 to its position designated by numeral 22b, as shown in FIG. 7, in which position the stem 23 is no longer in the enlarged end 51 but in the guideway itself, immediately adjacent thereto.

With the longitudinal edge 56 of the positioning arm or member 10 in engagement with the abutment 55, the positioning arm 10 is rocked about its pivot axis which is no longer the lug 22 but the abutment 55, the direction of rocking movement being counterclockwise, as indicated by arrow F1 in FIG. 6.

During the last-mentioned rocking movement, before the longitudinal edge 57 of the positioning arm or member 10 abuts against the pivot pin 11b, the positioning arm or member 10 is lifted perpendicular to the plane of FIG. 6 so as to bring the aperture 13 into position over the end portion 43 which forms the continuation of pivot pin 11b. The bending or deformation of the positioning arm or member 10 is made feasible by the selection of the thickness and nature of the constituent (synthetic plastic) material of the positioning arm or member 10 in such a way that the positioning arm or member 10 is afforded flexibility or elasticity generally perpendicular to the imaginary line joining the pivot axis to the lug (that is, parallel to the pivot axis of the positioning arm or member 10) between the guide lug 22 and the end of the positioning arm or member 10 incorporating the aperture 13.

When the aperture 13 is in position right above the pivot pin 11b, pressure is exerted on the end of the positioning arm or member 10 to click or snap the aperture 13 over the pivot pin 11b, which accordingly define detent means. In the course of snapping the members into place the strips 20 and 21, which are on opposed sides of the aperture 13, flex elastically because they are thrust towards the longitudinal edges of the positioning arm or member 10 by reason of the gradually increasing section of the frustoconical end portion 43.

The thickness of the positioning arm or member 10 defining or surrounding the aperture 13 is less than the height 1 (FIG. 5) between the raised edge 42b (in line with the lug 22) of the support or panel 40 and the underside or large base 44 of the frustoconical end portion 43; the strips 20 and 21 become lodged under the large base 44 after they clear the frustoconical end portion 43. In view of the fact that before the mounting of the positioning arm or member 10 the distance between the edges 14 and 15 of the aperture 13 is less than the diameter of the pivot pin 11b, the strips 20 and 21 bear snugly, without play, against the pivot pin 11b. This arrangement also permits whatever play which might otherwise develop between the pivot pin 11b and the strips 14 and 15 after long service of the positioning device to be taken up as well as play due to variations in manufacturing tole rances.

The positioning arm or member 10 thus mounted (position 10b in FIG. 7) may not be accidentally disassembled. Indeed, the head 24 of the guide lug 22 prevents, regardless of the position of the positioning arm or member 10, the stem 23 from escaping from the guideway 47 and the ledge defined by the large base 44 of the frustoconical end portion 43 prevents the positioning arm or member 10 from coming apart from the pivot pin 11b. Further, the abutment 55 prevents the lug 22 from re-entering the enlarged end 51 of the guideway 47.

The pointer 12 is intended to enable manual control of the position of the positioning arm 10.

As the guide lug 22 is displaced along the guideway 47 between its positions 22b and 22c (FIG. 7) the tip of the pointer 12 undergoes substantially rectilinear displacement while the other end of the positioning arm 10 is displaced so that the edges 14 and 15 of the aperture 13 slide along the pivot pin 11b. It is the configuration of the guideway 47 which ensures rectilinear displacement of the tip of the pointer 12.

In the embodiment, a Bowden wire (not shown) which is attached to the lug 55 is affixed to a flap of an air conditioning vent (also not shown) installed in the interior of a motor vehicle. In this case, the pointer 12 is visible on the dash-board or facia of the vehicle and its displacement controls the opening of the flap, the positioning arm or member 10 thus constituting a lever.

The invention is not, however, intended to be limited to such an application. It is applicable whenever the position of a member is to be fixed with respect to another member. The present assembly is thereby useful for both controlling devices and setting values.

Finally, it will be recalled that since the strip is tensioned the lug 31 is elastically urged against one side of the support or panel 40 so that the positioning arm 10 cannnot pivot freely, in other words its positions may be accurately set and maintained.

The invention is also not intended to be limited to the illustrated embodiment. Rather, it encompasses all variations, alternatives and equivalents within the scope of the appended claims. Thus, for example, the pivot pin 11b may be borne by the end of the positioning arm or member and conversely the corresponding aperture formed in the support or panel.

It will also be noted that the guide lug may be removably secured to the rest of the positioning member and not integrally formed therewith.

What is claimed is:

1. A positioning device comprising a pivotable positioning member having a guide lug extending parallel to and spaced from its pivot axis, and a support member cooperable with said positioning member and having a guideway for said guide lug, said guide lug having means for maintaining said positioning member on said support member in a direction parallel to the pivot axis by co-operation with the portion of said support member defining said guideway, said guideway having an enlarged end for introducing said guide lug into said guideway, and abutment means for preventing said guide lug from re-entering into the enlarged end of said guideway after said positioning member is mounted on said support member and further comprising a strip integrally formed with the rest of said positioning member and spaced therefrom along its longitudinal sides by slits, said strip having a protruding portion extending parallel to the pivot axis of said positioning member, said strip being elastically urged through the end of the protruding portion against one side of said support member when said positioning member is mounted thereon.

2. A positioning device according to claim 1, wherein at least one of the edges defining said guideway, including its enlarged end, has a beveled portion arranged so that in mounting said positioning member on said support member the protruding portion slides along the beveled portion so as to gradually tension said strip carrying the protruding portion.

3. A positioning device comprising a pivotable positioning member having a guide lug extending parallel to and spaced from its pivot axis, and a support member cooperable with said positioning member and having a guideway for said guide lug, wherein said guide lug terminates in a cap of appropriate size for maintaining said positioning member on said support member in a direction parallel to the pivot axis by cooperation with the portion of said support member defining said guideway, said guide lug with its cap being an unseparable part of said positioning member, said guideway has an enlarged end for introducing said guide lug into said guideway, abutment means are provided for preventing said guide lug from re-entering into the enlarged end of said guideway after said positioning member is mounted on said support member, and a spring means is integrally formed with the rest of said positioning member in order to maintain the positioning member in that position relative to the support member in which it was set until the setting is subsequently changed.

4. A positioning device according to claim 3, wherein said abutment means comprises a protruding portion integrally formed with said support member and adapted to come into abutting relation with an edge of said positioning member.

5. A positioning device according to claim 4, wherein said abutment means is disposed remote from the pivot axis for said positioning member relative to said guideway.

6. A positioning device according to claim 4, wherein said abutment means is formed in one piece with the rest of said support member.

7. A positioning device according to claim 3, wherein said positioning member is elastically deformable generally transversely of an imaginary line joining its pivot axis and said guide lug thereon.

8. A positioning device according to claim 3, wherein said support member comprises a pivot pin having a stem of uniform section adapted to be introduced into an aperture provided in said positioning member, detent means provided on said pivot pin comprising an outwardly tapering head portion on the free end of the stem, the large base of the head portion being greater in diameter than the stem, an auxiliary aperture in said positioning member defining a strip with said first mentioned aperture, said strip being sufficiently narrow to flex elastically when the stem is received in the first mentioned aperture.

9. A positioning device according to claim 1, 3, or 8, wherein said positioning member is of one-piece molded plastic construction.

10. A positioning device according to claim 2 or 8, wherein said support member is of one-piece molded plastic construction.

11. A positioning device according to claim 3, wherein one of said members has an aperture cooperable with a pivot pin on the other said member, the aperture being oblong so that in the course of displacement of said positioning member the pivot axis shifts longitudinally of the aperture in said other member, said guideway being generally curvilinear and said pivot pin lying to the convex side of said curvilinear guideway, whereby the end of said positioning member remote from its pivot axis undergoes substantially rectilinear displacement as said positioning member pivots.

12. A positioning device according to claim 3, wherein the positioning member has an aperture cooperable with a pivot pin on said support member, an auxiliary aperture being associated with said first-mentioned aperture for defining a narrow strip therebetween, said pivot pin terminates in an outwardly tapering head portion having its large base larger in diameter than said pivot pin itself and its small, free end almost equal in diameter to the rest of said pivot pin, the width of the narrow strip being such that it flexes elastically when the head portion is inserted, the first-mentioned aperture being smaller in width than the diameter of said pivot pin before said positioning member is mounted on said support member.

13. A positioning device according to claim 12, wherein two said auxiliary apertures are provided so as to form between the first-mentioned aperture and each said auxiliary aperture a narrow strip adapted to flex elastically when said pivot pin is inserted into the first-mentioned aperture.

14. A positioning device according to claim 12 or 13, wherein edges defining the first-mentioned aperture each have a beveled portion for facilitating the insertion of said pivot pin into the first-mentioned aperture.

15. A positioning member for a positioning device according to claim 3, comprising at one of its ends an aperture defining with an auxiliary aperture a narrow strip elastically flexible perpendicular to the pivot axis of said positioning member, said guide lug and its cap being of one-piece construction with the rest of said positioning member, and a second strip also of one-piece construction with the rest of said positioning member adapted to flex elastically parallel to the pivot axis, a protruding portion on the second strip parallel to the pivot axis and projecting from the same side of said positioning member as said lug.

16. A positioning member for a positioning device according to claim 3, comprising a pivot pin at one of its ends and, and guide lug and its cap being of one-piece construction with the rest of said positioning member and a strip also in one-piece construction with the rest of the positioning member adapted to flex elastically parallel to the pivot axis, a protruding portion on said strip projecting parallel to the pivot axis and extending from the same side of said positioning member of said lug.

17. A positioning member according to claim 15 or 16, wherein said positioning member is of molded synthetic plastic material.

18. A control device comprising a pivotable motion transmission member defining a lever for positioning another member, said motion transmission member having a guide lug extending substantially parallel to and spaced from its pivot axis, and a support member for said motion transmission member having a guideway for said guide lug, wherein said guide lug which is integral with the positioning member comprises a cap for maintaining said positioning member in a direction parallel to the pivot axis in cooperation with the portion of said support member defining said guideway, said guideway having an enlarged end for mounting said guide lug in said guideway, abutment means is provided for preventing said guide lug from re-entering the enlarged end of said guideway after the mounting of said motion transmission member, and spring means is integrally formed with the rest of the positioning member in order to maintain the positioning member in that position relative to the support in which it was set until the setting in subsequently changed.

19. A positioning device comprising a pivoted positioning member having a guide lug spaced from and substantially parallel to its pivot axis, and a support member for said positioning member having a guideway for said guide lug, wherein said guide lug, which is integral with said positioning member, includes a cap portion adapted to cooperate with a portion of said support member defining said guideway to maintain said positioning member on said support member in a direction parallel to the pivot axis, said guideway has an enlarged end for mounting said guide lug in said guideway, said support member and said positioning member have cooperable detent means for securing said positioning member on said support member for pivotal movement, said detent means comprising a stem formed in one piece with one of said members and a complemmentary aperture in said other member, said positioning member being elastically deformable generally perpendicular to an imaginary line joining said lug and the pivot axis for permitting mounting of said positioning member, a means is provided for preventing, after said positioning member is mounted on said support member, said guide lug from re-entering the enlarged end of said guideway, and a spring means is integrally formed with the rest of the positioning member in order to maintain the positioning member in that position relative to the support member in which it was set until the setting is subsequently changed.

* * * * *